D. J. EDWARDS & E. HUSTON.
POTATO SEPARATOR.
APPLICATION FILED NOV. 18, 1912.
1,059,129.
Patented Apr. 15, 1913.
3 SHEETS—SHEET 3.
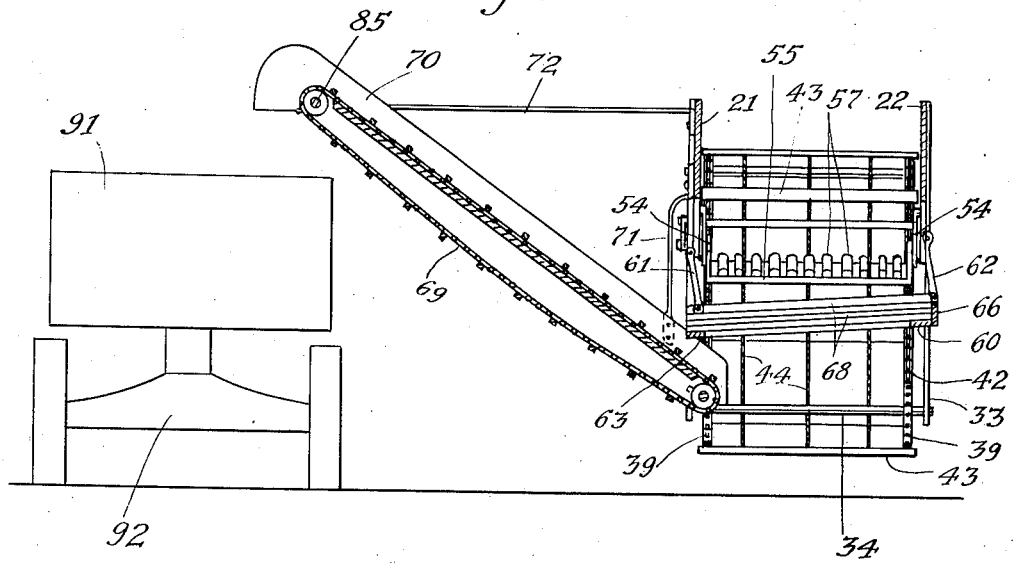
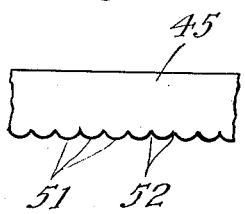
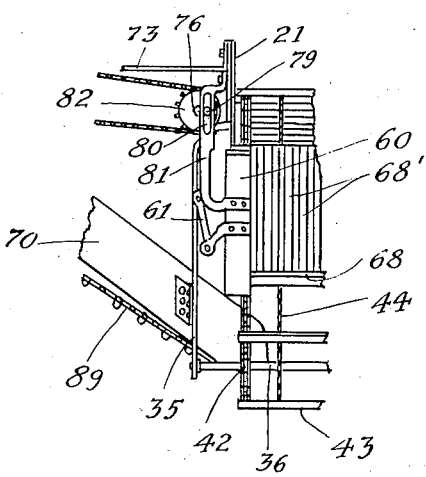
Witnesses:
Inventors:
Elmer Huston,
David J. Edwards.
By F. A. Whiteley
their Attorney.

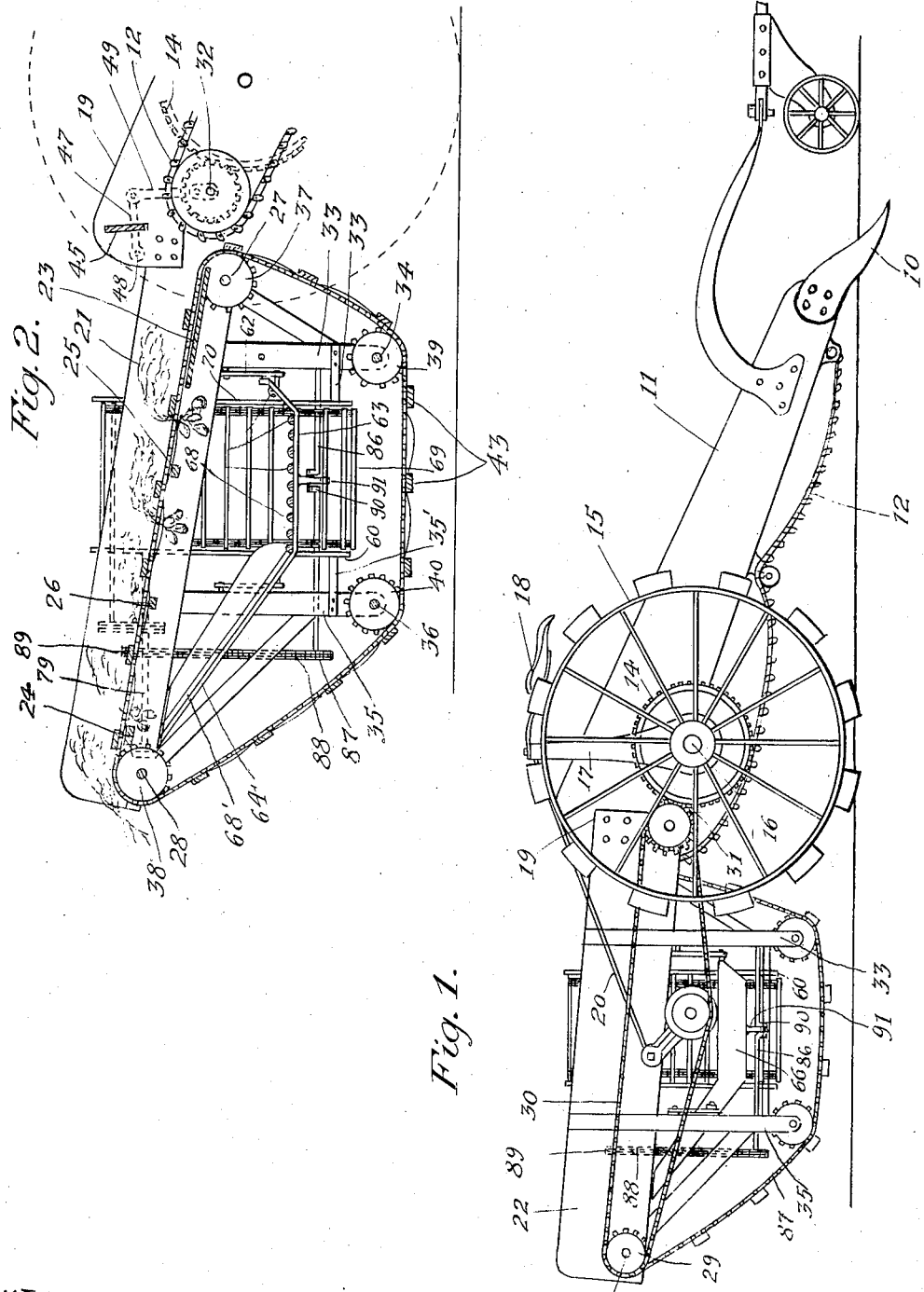

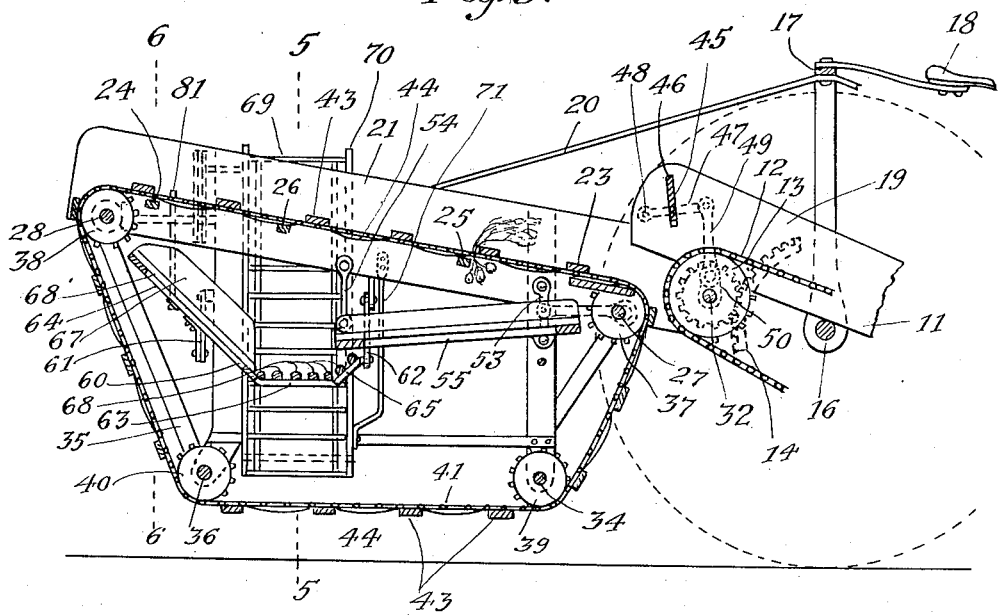
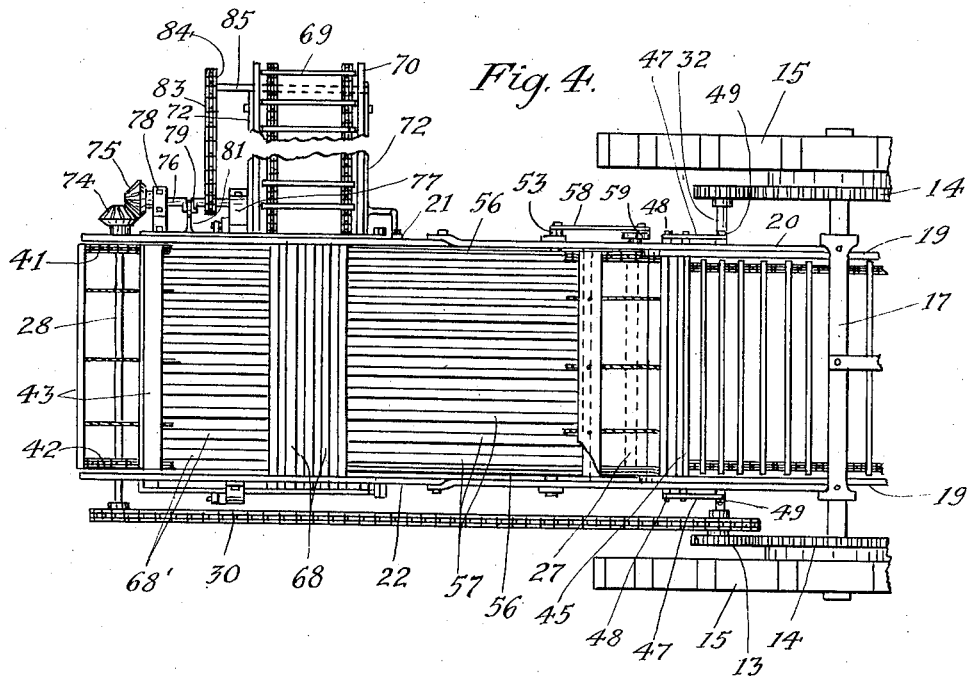

UNITED STATES PATENT OFFICE.

DAVID J. EDWARDS AND ELMER HUSTON, OF BIG LAKE, MINNESOTA.

POTATO-SEPARATOR.

1,059,129.  Specification of Letters Patent.  Patented Apr. 15, 1913.

Application filed November 18, 1912. Serial No. 731,979.

*To all whom it may concern:*

Be it known that we, DAVID J. EDWARDS and ELMER HUSTON, citizens of the United States, residing at Big Lake, in the county of Sherburne and State of Minnesota, have invented certain new and useful Improvements in Potato-Separators, of which the following is a specification.

Our invention relates to machines for separating potatoes from vines, dirt and foreign matter and delivering them in cleaned condition to a receptacle or wagon body or other proper device for receiving the said tubers.
It is the object of our invention to provide an attachment to potato diggers of well known construction which shall receive the potatoes, vines, weeds, earth, clods, etc., and operate to strip the potatoes from the vines, free the potatoes from dirt and other extraneous matter and deliver the potatoes at one side of the machine while the vines, earth and extraneous matter are deposited back of the potato digger.
The full objects and advantages of our invention will appear in connection with the detailed description thereof and are particularly pointed out in the claims.

In the drawings, illustrating the application of our invention in one form,— Figure 1 is a side elevation of a potato digger of well known construction having our improvements applied thereto. Fig. 2 is a longitudinal sectional view of our invention, as shown in Fig. 1. Fig. 3 is a longitudinal section showing a different arrangement of shakers. Fig. 4 is a plan view of the parts shown in Fig. 3. Fig. 5 is a section on line 5—5 of Fig. 3 showing a cart for reception of cleaned tubers. Fig. 6 is a partial section on line 6—6 of Fig. 3. Fig. 7 is a detail view of a portion of the retarder bar.

The potato digger, comprising a shovel plow 10, elevator chute 11, endless shaker chain 12 driven by rollers 13 from spur gears 14 on traction wheels 15, and the axle 16 and arch 17 having secured thereto the driver's seat 18, are or may be parts of potato diggers of well known construction and form no part of our invention. Bolted to the wings 19 of the chute 11 and supported by rods 20 extending from arch 17 are two side frame members 21 and 22 which are rigidly secured together by means of end plate bars 23 and 24 and intermediate stripper bars 25 and 26, as clearly shown in Figs. 2 and 3. Journaled in the side members 21 and 22 adjacent and outside of plate bar 23 is a shaft 27, a similar shaft 28 being journaled in bars 21 and 22 adjacent the outer ends thereof and outside of plate bar 24. The shaft 28, as most clearly shown in Figs. 1 and 4, extends outside of frame member 22 having thereon a sprocket wheel 29 driven by a sprocket chain 30 from a sprocket wheel 31 on the shaft 32 of the digger roller 13. A pair of front hangers 33 extend downwardly from side members 21 and 22 and have journaled therein a shaft 34. A pair of rear hangers 35 are correspondingly suspended from members 21 and 22 and have journaled therein a shaft 36 similar to shaft 33. Upon shaft 27 within the frame members 21 and 22 is a pair of sprocket wheels 37, a similar pair of sprocket wheels 38 being provided on shaft 28. On shafts 34 and 36 are pairs of sprocket wheels 39 and 40, respectively, falling in the same vertical plane as sprocket wheels 37 and 38. Over these two sets of sprocket wheels runs a pair of sprocket chains 41 and 42, respectively. Secured to the sprocket chains 41 and 42 are a series of slats 43 which are intermediately connected by a plurality of cords 44 hanging loosely between the slats 43. The slats and the cords are so spaced as to leave openings of considerable extent between adjacent pairs of the same through which the heavier tubers and other material delivered to the conveyer consisting of said slats and cords will descend by gravity while the vines, weeds, etc., will be upheld by the slats 43 and cords 44.

It will be noted that shaft 27 is positioned relatively to shaft 32 so as to bring the upper plane of movement of slats 43 considerably below the upper point of delivery of the digger conveyer 12. Also, the gear 29 is considerably smaller than the gear 31 so that the conveyer formed of slats 43 and cords 44 is driven at a relatively greater speed than the digger conveyer 12. The effect of this is that material delivered from the end of digger conveyer 12 has to fall a considerable distance before reaching the conveyer slats 43 and is immediately moved rapidly rearwardly thereby, thus tending to advance the tubers ahead of the vines since the tubers are relatively heavier than the vines and will normally reach the conveyer bars 43 first. Further to retard the vines and insure that the tubers will go over the conveyer bars ahead of the vines we provide a retarder 45 which comprises a transverse bar mounted for vibration in slots 46 in the side members 19, said bar being pivotally secured to arms 47 pivoted at 48 to members 19. The free ends of arms 47 are pivotally connected to the ends of links 49 which are vibrated by cranks or eccentrics 50 on shaft 32. The retarder bar 45 may have the lower edge formed, as indicated in Fig. 7, with a series of rounded protuberances 51 and angular indentations 52 between the same. These will have the effect to catch and hold back the vines while not injuring or affecting the movement of the tubers. The vibratory movement of the retarder bar will prevent clogging.

The primary object of retarding the vines, as above indicated, and moving the tubers by bars 43 in advance of the vines is to insure that the tubers will drop through over bars 43 and between pairs of cords 44. The operation of a shovel digger such as that herein disclosed has the effect of lifting potatoes and vines together. The tubers in all cases are attached to the vines and with some varieties of potatoes cling so tenaciously that it requires the exercise of considerable force to separate the potatoes and vines. When, however, the tubers fall over the bars 43 and below the plane thereof, as indicated in Fig. 3, the movement of said bars 43 across the stripper bars 25 and 26 will effectively and certainly strip the tubers from the vines.

For receiving the tubers after they drop through between bars 43 and cords 44, we provide either the single shaking screen shown in Figs. 1 and 2 or the double shaking screen arrangement shown in Figs. 3 and 4. As shown in Figs. 3 and 4, we suspend from frame members 21 and 22 by means of swinging links 53 and 54 so as to vibrate longitudinally or in the direction of travel of the bars 43, a screen 55 comprising side members 56 and longitudinally extended bars 57 spaced apart so as to permit earth and smaller potatoes to pass between the same. The screen 55 is oscillated by means of a link 58 pivotally connected with link 53 and reciprocated by a crank 59 on the end of shaft 27. The screen 55 is hung so as to slope slightly downwardly toward the rear and the rear end thereof discharges into a shaking screen 60 suspended by links 61 and 62 for vibration transversely or at right angles to the direction of vibration of screen 55. The screen 60 comprises a bottom comparatively narrow portion 63, a long sloping portion 64 extending upwardly from portion 63 to adjacent the sprocket wheels 38, and a short and upwardly sloping portion 65 extending from the front side of portion 63 beneath the end of shaker 55. The shaking screen 60 has a retarding board 66 extending clear across one end thereof, as shown in Fig. 1, a similar retarding board 67 extending along the end of the sloping portion 64 only.

As clearly shown in Figs. 2, 3 and 4, the screen 60 comprises a series of slats 68 on the portions 63 and 65 thereof, said slats extending transversely or at right angles to the slats 57 of shaker 55, and a series of longitudinal slats 68' on the portion 64. As best shown in Fig. 5, the portion 63 of shaker 60 slopes slightly from one side to the other of the machine, the upper end, as before stated, being closed by the wall 66 while the lower end overhangs an endless conveyer 69 operating in the trough of a conveyer chute 70 which, as shown in Figs. 3 and 6, is supported at its lower end by hanger 35, and a special rod or hanger 71, or as shown in Fig. 2, by brackets 33' and 35' secured to hangers 33 and 35, respectively, the top of said chute 70 being supported from frame member 21 by a pair of brace rods 72 and 73. For driving the transverse shaker 60 and endless conveyer 69 a bevel gear 74 on the end of shaft 28 meshes with a bevel gear 75 on a shaft 76 journaled in brackets 77 and 78 secured to the side of frame member 21. As best shown in Fig. 6, the shaft 76 is provided with a crank 79 which operates in the slot 80 in an arm 81 fast on the shaker screen 60. On the end of shaft 76 is a sprocket wheel 82 over which extends a sprocket chain 83 running over a sprocket wheel 84 on the end of a shaft 85 journaled in the walls of the conveyer chute 70 and having thereon a suitable roller or sprocket wheels for driving the endless conveyer 69.

As shown in Fig. 2, the longitudinal shaker screen 55 is omitted, the transverse shaker screen 60 being extended and lowered somewhat and the portions 63 and 64 thereof each being considerably wider. In this case the said conveyer 69 will need to be much wider than where used with the longitudinal shaker, as shown in Figs. 3 and 4. The drive of the side elevating conveyer is the same in both instances, but where the long transverse conveyer is used, as shown in Figs. 1 and 2, a special crank shaft 86 is journaled in boxings upon hangers 33 and 35 below the bottom of transverse shaker screen 60, said shaft 86 having on the end thereof a sprocket wheel 87 which is driven by a sprocket chain 88 running over a sprocket wheel 89 replacing the crank 79 on the shaft 76. The shaft 86 is provided with a crank 90 which operates a pitman 91 for oscillating or shaking the transverse shaker 60.

The operation of our device has been quite fully given in connection with the detailed description of the various parts thereof.

The shovel plow 10 operates in the usual way to lift the earth, the potatoes embedded therein, and the vines up within the chute 11. The digger conveyer 12 carries all of this material to the top thereof meantime shaking out most of the loose earth. When the remaining substances reach the top of the incline, as best shown in Figs. 2 and 3, such substances drop over the end of the digger conveyer 12, the heaviest material, such as earth and tubers tending to move ahead of vines and weeds, which are additionally retarded and turned back by the retarder 45. The bars 43, moving more rapidly than the digger conveyer 12, push the potatoes and other material along the end plate bar 23 over the edge of which and through the openings between the bars 43 and the cords 44 the potatoes and earth will fall. Potatoes clinging to the vines will be stripped therefrom by the stripper bar 25. If earth or other obstructions prevent such from getting through to the bar 25 they will be likely to drop through before reaching the stripper bar 26 or the end plate bar 24 and the last of the potatoes will be stripped off of the vines by these last mentioned stripper bars. Vines, weeds, etc., upon the bars 43 and cords 44 will be discharged at the end of the frame members 21 and 22 dropping to the ground entirely free of the potatoes and loose earth. Those potatoes which first drop through the openings between bars 43 and cords 44 and which are stripped by the stripper bar 25 will fall upon the longitudinal shaking screen 55 (where such is used) and by this screen will be freed from most of the dirt still clinging to the potatoes. At the same time the small and undesirable potatoes will be sorted from those which are marketable falling between the bars 57 of screen 55 to the ground. The potatoes dropping upon the screen 55 will be discharged upon the lower portion 63 of transverse shaking screen 60. The potatoes stripped by stripper bar 26 will also fall directly upon the lower portion 63 of transverse shaker 60. The potatoes falling through between stripper bar 26 and end plate bar 24 and which are stripped by end plate bar 24 will fall upon the sloping portion 64 of transverse shaker 60 and will roll down this to the lower portion 63 of transverse shaker 60. In practice it may be desirable, and we contemplate it as a part of our invention that the longitudinal screen 55 shall be extended entirely above the lower portion 63 of transverse shaker screen 60. The potatoes falling upon said lower portion 63, and also in rolling down the oblique portion 64 are freed of the last clinging remnants of earth and separated from the remaining small potatoes, which will fall through between the bars 68, and are delivered from the end of transverse shaker 60 upon the side conveyer 69 within the conveyer chute 70. This side conveyer overhangs a receptacle 91 which in practice we have found to be best carried upon a truck 92 to be drawn alongside of the potato digger by one horse. When the receptacle 91 is filled the truck may be readily driven up to a wagon and the potatoes therein forked from the truck into the wagon box.

A machine corresponding to the invention herein claimed has been built by us and successfully and extensively operated and we have found it to be a fact that the potatoes are delivered to the receptacle 91 almost freed from dirt and extraneous matter of any sort, and suitably sorted for market purposes.

We claim:

1. In combination with the elevating conveyer of a potato digger, means for receiving the material including potatoes discharged from the end of said digger conveyer and transporting the same rearwardly, means for stripping the potatoes from the vines as said material is being transported, means for freeing the potatoes from earth and sorting the same after said potatoes have been stripped from the vines, and means for elevating said sorted and cleaned potatoes and delivering the same at a point removed from the side of the machine.

2. In combination with the elevating conveyer of a potato digger, a rearwardly moving conveyer for receiving material from said digger conveyer, a retarder for holding back vines as the potatoes pass from the digger conveyer to the second named conveyer, means for stripping potatoes from the vines as the same are moved along by the second named conveyer, means for freeing the potatoes from earth and sorting the same after said potatoes have been stripped from the vines, and means for elevating said sorted and cleaned potatoes and delivering the same at a point removed from the side of the machine.

3. In combination with the elevating conveyer of a potato digger, a rearwardly moving conveyer for receiving material from said digger conveyer, a retarder for holding back vines as the potatoes pass from the digger conveyer to the second named conveyer, and means for stripping potatoes from the vines as the same are moved along by the second named conveyer.

4. In combination with the elevating conveyer of a potato digger, a second conveyer having a portion thereof adjacent the turn and below the highest point of delivery of the digger conveyer, means for moving the second conveyer at a greater rate of speed than the digger conveyer for causing the tubers and heavier material which first reach said second conveyer to be moved ahead of the vines and lighter material, and means coöperating with the second conveyer for separating the vines and tubers.

5. In combination with the elevating conveyer of a potato digger, a second conveyer having a portion thereof adjacent the turn and below the highest point of delivery of the digger conveyer, means coöperating with the second conveyer for separating vines and potatoes carried thereby, means for moving the second conveyer at a greater rate of speed than the digger conveyer, and a retarder located above said highest point of delivery.

6. In combination with the elevating conveyer of a potato digger, a second conveyer having a portion thereof adjacent the turn and below the highest point of delivery of the digger conveyer, means coöperating with the second conveyer for separating vines and potatoes carried thereby, means for moving the second conveyer at a greater rate of speed than the digger conveyer, and a vibrating bar extending across and above said highest point of delivery for retarding vines and other light material.

7. In combination with the elevating conveyer of a potato digger, a second conveyer having a portion thereof adjacent the turn and below the highest point of delivery of the digger conveyer, means coöperating with the second conveyer for separating vines and potatoes carried thereby, and a vibrating bar extending across said digger conveyer and above said highest point of delivery for retarding vines and other light material.

8. In combination with the elevating conveyer of a potato digger, a second conveyer having a portion thereof adjacent the turn and below the highest point of delivery of the digger conveyer, means coöperating with the second conveyer for separating vines and potatoes carried thereby, and a vibrating bar for retarding vines and other light material.

9. In combination with the elevating conveyer of a potato digger, a second conveyer having a portion thereof adjacent the turn and below the highest point of delivery of the digger conveyer, means coöperating with the second conveyer for separating vines and potatoes carried thereby, a vibrating bar for retarding vines and other light material, said bar being formed on the edge adjacent the said conveyers with angular indentations and rounded protuberances.

10. In combination with the elevating conveyer and side wings of a potato digger, a second conveyer having a portion thereof adjacent the turn and below the highest point of delivery of the digger conveyer, means coöperating with the second conveyer for separating vines and potatoes carried thereby, a transverse bar mounted for vertical sliding movements in said wings and across said digger conveyer above said highest delivery portion, and means for vibrating said bar.

11. In combination with the elevating conveyer of a potato digger, a second conveyer having a portion thereof adjacent the turn and below the highest point of delivery of the digger conveyer, said second conveyer having openings through which potatoes and heavier material may pass, and means for restraining the vines from passing through said opening, and members over which said second conveyer passes for stripping the potatoes from the vines.

12. In combination with the elevating conveyer of a potato digger, a second conveyer having a portion thereof adjacent the turn and below the highest point of delivery of the digger conveyer, a vibrating bar for retarding vines and other light material, said second conveyer comprising bars over which the vines are laid and having openings through which the potatoes may pass, and members over which said bars are moved for stripping the potatoes from the vines.

13. In combination with the elevating conveyer of a potato digger, a rearwardly moving conveyer for receiving material from the digger conveyer comprising bars and connecting cords for holding up the vines with intervening spaces through which the potatoes may pass, and a fixed bar over which said conveyer bars are moved for stripping the potatoes from the vines.

14. In combination with the elevating conveyer of a potato digger, a rearwardly moving conveyer for receiving material from the digger conveyer comprising bars and connecting cords for holding up the vines with intervening spaces through which the potatoes may pass, a plurality of fixed bars over which said conveyer bars are moved for stripping the potatoes from the vines, and means under all of said bars for freeing the potatoes from earth and sorting the same after said potatoes have been stripped from the vines.

15. In combination with the elevating conveyer of a potato digger, a second conveyer and means for moving the same rearwardly, said second conveyer being provided with openings through which potatoes may fall and having means for retaining vines and other light material upon the same, means spacing the outgoing and return runs of said second conveyer, a sorting and cleaning shaker suspended for transverse vibration between said spaced runs, and means for vibrating said shaker.

16. In combination with the elevating conveyer of a potato digger, a second conveyer and means for moving the same rearwardly, said second conveyer being provided with openings through which potatoes may fall and having means for retaining vines and other light material upon the same, means spacing the outgoing and return runs of said second conveyer, a sorting and cleaning shaker suspended for transverse vibration between said spaced runs and having portions thereof extended so as to underlie all of the effective portion of the upper run of the conveyer, means for vibrating the shaker, and means for receiving potatoes from the shaker and elevating them to a point at one side of the machine.

17. In combination with the elevating conveyer of a potato digger, a second conveyer and means for moving the same rearwardly, said second conveyer being provided with openings through which potatoes may fall and having means for retaining vines and other light material upon the same, a sorting and cleaning shaker suspended for transverse vibration below said second conveyer, said shaker having a central low portion inclined toward one side of the machine and upwardly sloping portions extending from said low portion, at least one of said sloping portions coming into close proximity with said conveyer, means for vibrating the shaker, and means for receiving potatoes from the lower end of the low portion thereof and elevating them to a point at one side of the machine.

18. In combination with the elevating conveyer of a potato digger, a second conveyer having the runs thereof spaced apart and means for continuously driving said second conveyer so that the upper portion thereof is moved rearwardly, a sorting and cleaning shaker suspended for transverse vibration between said spaced runs and at the rear of said second conveyer, a second shaker suspended for longitudinal vibrations beneath the forward part of the second conveyer and having the delivery end thereof overhanging the transverse shaker, means for vibrating the longitudinal shaker, means for vibrating the transverse shaker, and means for receiving potatoes from the transverse shaker and elevating them to a point at one side of the machine.

19. In combination with the elevating conveyer of a potato digger, a rearwardly extending frame provided with a series of fixed bars, a second conveyer having the runs thereof spaced apart and means for continuously driving said second conveyer so that the upper run thereof is moved rearwardly across said bars for stripping the potatoes from the vines, a cleaning and sorting shaker suspended for longitudinal vibration between the runs beneath the forward bars, a second shaker suspended for transverse vibration between the runs and beneath the rear bars and positioned to receive potatoes from the rear end of the longitudinal shaker, means for vibrating the longitudinal shaker, means for vibrating the transverse shaker, and means for receiving potatoes from the transverse shaker and elevating them to a point at one side of the machine.

20. In combination with the elevating conveyer of a potato digger, means for separating the vines from the potatoes, a transversely vibrating shaker for receiving potatoes from the separating means and cleaning and sorting the same, and an elevating side conveyer receiving potatoes from the transverse shaker.

21. In combination with the elevating conveyer of a potato digger, a potato and vine separating conveyer moving rearwardly from said digger conveyer, a longitudinally vibrating shaker and a transversely vibrating shaker receiving potatoes from the separating conveyer, said longitudinally vibrating shaker discharging potatoes upon the transversely vibrating shaker, and an elevating side conveyer receiving potatoes from the transversely vibrating conveyer.

22. In combination with the elevating conveyer of a potato digger, means for separating the vines from the potatoes, a transversely vibrating shaker for receiving potatoes from the separating means and cleaning and sorting the same, said shaker comprising a low portion provided with slats running in the direction of vibration and being inclined toward one side of the machine and comprising a sloping portion provided with slats running upwardly at right angles to the slats of the low portion, and an elevating side conveyer receiving potatoes from the low portion of the shaker.

In testimony whereof we affix our signatures in presence of two witnesses.

DAVID J. EDWARDS.
ELMER HUSTON.

Witnesses:
CHAS. F. KNAPP,
ARCHIE LARSON.